US006751043B2

United States Patent
Magee et al.

(10) Patent No.: US 6,751,043 B2
(45) Date of Patent: Jun. 15, 2004

(54) DIGITAL SERVO CONTROL SYSTEM FOR A HARD DISC DRIVE USING A VOICE COIL MOTOR IN VOLTAGE MODE

(75) Inventors: David P. Magee, Plano, TX (US);
Michael T. DiRenzo, Coppell, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 295 days.

(21) Appl. No.: 09/998,757

(22) Filed: Dec. 3, 2001

(65) Prior Publication Data

US 2002/0114098 A1 Aug. 22, 2002

Related U.S. Application Data

(60) Provisional application No. 60/255,871, filed on Dec. 15, 2000.

(51) Int. Cl.$^7$ .............................................. G11B 5/596
(52) U.S. Cl. ................... 360/77.02; 360/78.06
(58) Field of Search ........................... 360/77.02, 78.06

(56) References Cited

U.S. PATENT DOCUMENTS

| | | | |
|---|---|---|---|
| 4,669,003 A | 5/1987 | Bell et al. | |
| 4,679,103 A | 7/1987 | Workman | |
| 4,740,736 A | 4/1988 | Sidman et al. | |
| 5,182,684 A | 1/1993 | Thomas et al. | |
| 5,576,909 A | * 11/1996 | Dierkes et al. | .......... 360/78.09 |
| 5,600,506 A | 2/1997 | Baum et al. | |
| 6,097,559 A | * 8/2000 | Ottesen et al. | ................. 360/31 |

FOREIGN PATENT DOCUMENTS

EP    0 461 915 A    12/1991

OTHER PUBLICATIONS

Woods, Dan; *Improved Disk Drives Through the Computational Power of DSP*, Data Storage, Sep. 2000 (copy attached downloaded from internet) 8 pages.

* cited by examiner

*Primary Examiner*—David Hudspeth
*Assistant Examiner*—Mitchell Slavitt
(74) *Attorney, Agent, or Firm*—Robert D. Marshall, Jr.; W. James Brady, III; Frederick J. Telecky, Jr.

(57) ABSTRACT

This invention comprises an architecture for voltage mode control of a voice coil motor in a hard disk drive. In contrast to conventional current mode control, coil current is not sensed or measured, which simplifies the feedback design with less hardware required in the implementation. Common design methodologies for the square root velocity profile, linear velocity profile and regulator/estimator control system designs can be migrated from the current mode architecture to the voltage mode architecture.

11 Claims, 5 Drawing Sheets

DIGITAL SERVO CONTROL SYSTEM FOR A HARD DISC DRIVE USING A VOICE COIL MOTOR IN VOLTAGE MODE

This application claims priority under 35 USC §119(e)(1) of Provisional Application No. 60/255,871, filed Dec. 15, 2000.

BACKGROUND

In a Hard Disk Drive assembly illustrated in simplified form in FIG. 1, the read/write R/W heads 101 are attached to one end of an actuator arm 102 that pivots about point 103. A voice coil motor VCM 104 is located at the opposite end of the arm and, when driven, generates a torque, $T_{vcm}$, about the pivot to control the head position, $\theta_h$. The spindle motor 105 drives multiple platters 106 which contain the stored information. The equivalent circuit model of the simplified HDD assembly, known in this discipline as the 'Plant', is illustrated in FIG. 2.

Because of errors in the servo-writing process and imperfections in the spindle bearings, the true location of a given track, y 201, moves beneath the head. Through the servo-writing process, position information is encoded onto the disk surface at a finite number of equally spaced locations around the disk known as servo sectors. At each servo sector, the read head serves as the position transducer for the VCM servo system, and provides the signal $y_m$ 202, the measured position of the head with respect to the track center line. The position measurement is processed by a compensation algorithm and produces a control signal, u 203, which is indicative of the desired VCM torque necessary to keep the R/W head on track in the presence of the various disturbance torques and disk errors. A power driver is used to transform the control signal into the power signal, $V_d$ 204, necessary to physically actuate the arm and move the head.

Voice Coil Motor

The VCM, consisting of a coil of wire sandwiched between two permanent magnets, produces an actuating torque on the arm carrying the R/W head. The torque is a function of the coil current and the position of the coils between the permanent magnets and can be described by the equation, $$T_{vcm}=k_t(i,\theta) \tag{1}$$

If we assume that the magnetic field strength, B, is constant over the full range of travel of the actuator, then the torque function can be approximated by the linear relation, $k_t(i,\theta)=K_t$, and (1) can be written, $$T_{vcm}=K_t i \tag{2}$$

If N is the number of turns in the coil, l is the length of each turn in the coil and r is the distance from the coil center to the arm pivot, then $K_t$ is given by, $$K_t=NBlr \tag{3}$$

Because a moving coil in a magnetic field generates an electric potential, known as the back e.m.f. voltage, the effective voltage on the coil, $V_c$, is a combination of the voltage supplied by the power driver, $V_d$, and the back e.m.f. voltage, $V_b$, $$V_c=V_d-V_b \tag{4}$$

The back e.m.f. voltage is a function of the angular velocity of the moving coil ω, and is given by the equation, $$V_b=K_t\omega \tag{5}$$

where $K_t$ is given by equation (3).

Conventional Hard Disk Drive Controllers

Voice Coil Motors in conventional hard disk drives are controlled with a current command to a transconductance loop. The principle, illustrated in FIG. 3, is that this high bandwidth current loop 301 is able to reject disturbances and provide more protection from system parameter uncertainty than a smaller bandwidth control system can. The circuitry and components needed to build the current loop can be costly when a hard disk drive manufacturer is producing millions of disk drives. Conventional current mode control architectures require both a measured coil current 301 and measured position 302 components to obtain a stable configuration.

The illustration of FIG. 4 is derived from U.S. Pat. No. 4,679,103 awarded Jul. 7, 1987 and is largely representative of presently used current mode control techniques. The position signal $P_{OS}(t)$ 400, which is a function of time, is amplified in block 411 and then separated into primary 402 and quadrature 404 components in the demodulator 412. These signals are converted to digital samples $P_{ESP}(n)$ 406 and $P_{ESQ}(n)$ 408 by A/D converters 413 and 414, respectively. Note that it is technically feasible to embody A/D converters 413 and 414 using a single digitizer multiplexed between the two analog inputs. This would save circuits. Note this alternative is feasible only if the sampling rate is low enough to permit the single digitizer to form two digital words each sample period, one for the in-phase signal and one for the quadrature signal. The voice coil current signal i(t) 403 is also sampled by an A/D converter 421, which develops the current feedback signal i(n) 405. Desired position signal XD 409 is supplied as an input to the state estimator and summing loop function 415 which completes computation of the control input signal u(n) 410 from the three components $P_{ESP}(n)$, $P_{ESQ}(n)$, and i(n). The digital signal u(n) is then converted in D/A converter 416 to the analog control input signal u(t) 420 which drives the power amplifier 417.

The possibility of removing the current feedback signal 403 and driving the VCM in voltage mode without any current feedback would allow for cost reduction in the electronic control module. If this could be implemented losing none of the desired performance, an extremely attractive alternative using voltage mode control could be realized. The following illustrates a current mode design using available simulation and synthesis techniques. This will provide a contrast to the present invention in which control of the voice coil motor is accomplished using a simpler voltage mode architecture.

Current Mode Control System

The conventional current mode control system makes use of a reduced order model for current mode control of a hard disk drive actuator and the related control system. This control system is divided into two parts: one for seeking mode and one for tracking mode. The design of each controller is discussed and guidelines are provided where appropriate after the model of the actuator is discussed.

Current Mode Actuator Model

The reduced order model of a hard disk drive actuator under current mode control may be shown to be of the form $$\dot{x}=Ax+Bu(t-\lambda)$$

$$y=Cx \tag{6}$$

where the state vector, x, was defined as $$x = \begin{bmatrix} \theta \\ \omega \\ b \end{bmatrix} \text{ and} \quad (7)$$

$$A = \begin{bmatrix} 0 & 1 & 0 \\ -\frac{K_{spr}}{J} & -\frac{K_v}{J} & \frac{K_t K_{drv}}{J} \\ 0 & 0 & 0 \end{bmatrix} B = \begin{bmatrix} 0 \\ \frac{K_t K_{drv}}{J} \\ 0 \end{bmatrix} C^T = \begin{bmatrix} K_{pes} \\ 0 \\ 0 \end{bmatrix}. \quad (8)$$

These equations (6), (7), and (8) represent collectively the information contained in the equation of FIG. 4 for current mode control. The states are θ, the angular position of the VCM shaft in units of radians, ω, the angular velocity of the VCM shaft in units of radians/sec and b, a bias in units of D/A bits. The output is y, the position of the read/write head in units of track bits. Since the plant is positioned by a discrete-time control system running in a DSP, a computational delay, λ, was incorporated into the model.

In that discussion the discrete-time model of the plant becomes $$x[n+1]=\Phi x[n]+\Gamma_2 u[n]+\Gamma_1 u[n-1]\, y[n]=Cx[n] \quad (9)$$

where $\Phi = e^{AT_s}$, $\Gamma_1 = \int_{T_s-\lambda}^{T_s} e^{At} B\, dt$ and $\Gamma_2 = \int_0^{T_s-\lambda} e^{AT} B\, dt$. By creating an additional state $x_a[n]=u[n-1]$ and augmenting it with the original state vector, the plant model becomes $$\begin{bmatrix} x[n+1] \\ x_a[n+1] \end{bmatrix} = \begin{bmatrix} \Phi & \Gamma_1 \\ 0 & 0 \end{bmatrix} \begin{bmatrix} x[n] \\ x_a[n] \end{bmatrix} + \begin{bmatrix} \Gamma_2 \\ 1 \end{bmatrix} u[n] \quad (10)$$

$$y[n] = [C\ 0] \begin{bmatrix} x[n] \\ x_a[n] \end{bmatrix}$$

For convenience in the firmware, the units of the state variables have be subjected to the transformation $$T = \begin{bmatrix} K_{pes} & 0 & 0 & 0 \\ 0 & K_{pes} \cdot T_s & 0 & 0 \\ 0 & 0 & 1 & 0 \\ 0 & 0 & 0 & 1 \end{bmatrix} \quad (11)$$

This transformation was applied to give the angular position state units of bits and the angular velocity state units of track bits/sample. The units of the bias state and the previous input state are unchanged by this transformation.

Following these steps, the numerical model of the current mode plant can be written in the form $$x[n+1]=Fx[n]+Gu[n]\, y[n]=Hx[n] \quad (12)$$

where $$F = \begin{bmatrix} 1 & 0.9960 & 1.8042 & 0.9591 \\ 0 & 0.9920 & 3.6036 & 1.1352 \\ 0 & 0 & 1 & 0 \\ 0 & 0 & 0 & 0 \end{bmatrix} G = \begin{bmatrix} 0.8451 \\ 2.4683 \\ 0 \\ 1 \end{bmatrix} H^T = \begin{bmatrix} 1 \\ 0 \\ 0 \\ 0 \end{bmatrix}. \quad (13)$$

The frequency response of the simplified model of the current mode plant has constant magnitude at low frequency which represents friction and cable bias in the plant and then changes to a double integrator effect about 5 Hz which represents the idealistic second-order plant created by the transconductance loop.

Given the model and frequency response of the current mode plant, the control system can be designed to make the hard disk drive seek and track. Since these two modes of operation are distinctly different, controller switching is employed in the transition between seeking and tracking modes.

Current Mode Seeking Controller

The purpose of the seeking controller is to move the actuator arm from the current track location to within a few tracks of a desired track location in the shortest amount of time possible. This objective is usually met by controlling the acceleration and deceleration portions of the seek trajectory with the help of an estimator/regulator control system. Once the head position error is within a prescribed number of tracks, the control system makes a transition from the seeking controller to the tracking controller.

The acceleration portion of the seek trajectory is basically open loop from a control systems perspective. The control system determines the sign and magnitude of the maximum command it can apply based on the direction and length of seek. Using an estimator, the velocity is predicted for the next control cycle to determine when the deceleration portion of the seek trajectory should be initiated. Once the predicted velocity exceeds the velocity necessary for decelerating to the desired track, the deceleration portion of the seek trajectory is activated.

The deceleration portion of the seek trajectory is separated into a linear velocity profile or a square root velocity profile depending on the number of tracks that the head is from the desired track. For example, denoting the number of tracks to go (sixty tracks in this example) with the variable $T_{lin}$, the linear velocity profile command can be written as $$v_{lin}=K \cdot P_{err} \text{ when } |P_{err}| \leq T_{lin} \quad (14)$$

where $v_{lin}$ is the desired velocity generated by the linear velocity profile method, K is the gain parameter relating position error to the desired velocity command and $P_{err}$ is the position error of the head, i.e. the difference between the desired track position $X_D$ of the head and the actual track position of the head.

The square root velocity profile method is derived from the kinematics of a simple second-order system. Assuming constant acceleration, the square root velocity profile command can be written as $$v_{sqrt}=sgn(P_{err}) \cdot \sqrt{v_0^2+2a|P_{err}|} \text{ when } |P_{err}|>T_{lin} \quad (15)$$

where $v_{sqrt}$ is the desired velocity generated by the square root velocity profile method, a is the magnitude of the acceleration and $v_0$ is a constant denoting an offset in the square root velocity profile.

By equating the value for each velocity profile and the slope of each velocity profile at the transition point $T_{lin}$, the unknown constants K and $v_0$ can be determined. The linear velocity profile can be written as $$v_{lin} = \sqrt{\frac{a}{T_{lin}}} \cdot P_{err} \quad (16)$$

and the square root velocity profile can be written as $$v_{sqrt} = sgn(P_{err}) \cdot \sqrt{2a\left(|P_{err}| - \frac{T_{lin}}{2}\right)}. \quad (17)$$

FIG. 5 shows a plot of the linear velocity profile command 501 and the square root velocity profile command 502 for ±200 tracks of position error, $P_{err}$. At $|P_{err}|=T_{lin}$, the linear velocity profile is tangent to the square root velocity profile.

The velocity profile technique requires that a method for estimating the velocity of the head must be developed. The predicted head velocity for the next sample time is needed during the acceleration portion of the seek trajectory and the current head velocity at the current sample time is needed during the deceleration portion of the seek trajectory. In a hard disk drive, the position of the head is determined by comparing the relative amplitudes of successive bursts but there are no signals present to determine the velocity of the head. As a result, an estimator is used to provide accurate velocity estimates during seek maneuvers. In addition, a regulator can be designed to accurately control the head position.

Reference [1] provides a thorough discussion of estimator/regulator control system design. The equations for a current estimator/regulator control system can be written as $$x_c[n]=x_p[n]+L_c(y[n]-Hx_p[n]) \quad x_p[n+1]=Fx_c[n]+Gu[n] \quad u[n]=-K_c x_c[n] \tag{18}$$

where $x_c$ is a vector of current estimator states, $x_p$ is a vector of predicted estimator states, $L_c$ is a vector of current estimator gains and $K_c$ is a vector of regulator gains.

From these expressions, the predicted head velocity can be determined for the acceleration portion of the seek trajectory and the current head velocity can be determined for the deceleration portion of the seek trajectory. A block diagram illustrating the seeking deceleration controller is shown in FIG. 6. Switching between the square root velocity profile and the linear velocity profile is indicated by the switch 600 with positions (a) square root velocity profile 601 and (b) linear velocity profile 602 respectively. The parameters $x_{c1}[n]$ 603 and $x_{c2}[n]$ 604 are defined by equation (18).

This form of feedback allows the square root velocity profile and the linear velocity profile to co-exist in the same control architecture. The current velocity estimate is subtracted from the desired velocity to form a velocity error which drives the rest of the control system.

Several methods exist to determine or estimate regulator gains. One approach involves placing the estimator roots so that the resultant response is faster than what would result from using regulator roots (by a factor of 2 to 4) so that the total response is dominated by the slower regulator poles. This is developed more fully in reference [1]. For the current estimator gains, z-domain roots of 0, 0.2373, 0.3009 and 0.8668 resulted in a gain matrix of $L_c$=[0.9376 0.6163 0.0197 0]$^T$. For the regulator gains, z-domain roots of 0.6675, 0.4724±j0.1239 and 1 resulted in gains of $K_c$=[0.0271 0.1445 1 0].

The frequency response of the current mode seeking controller is that of a typical network having an integrator and using two lead terms to add phase margin to the plant near the crossover frequency and two poles to flatten the frequency response at high frequency. There is also a lead/lag pair at high frequency to satisfy the controller order constraints of the regulator/estimator design.

The controller frequency response can be combined with the plant frequency response to produce the open loop frequency response for the seeking mode. For this seeking controller, the gain margin is 7.1 dB, the phase margin is 31.4° and the open-loop crossover frequency is 520.8 Hz. This controller is used to move the head only to within 2 or 3 tracks of the desired track. At that point, the tracking controller becomes active.

Current Mode Tracking Controller

The purpose of the tracking controller is to assume control of the VCM from the seeking controller when the head is a few tracks away for the desired track and move it to the desired location with less than one track of overshoot. Once the head is within some prescribed fraction of a track for several consecutive control cycles, the system is considered to be 'on-track' and reading and writing of data can occur. If the head position ever exceeds some pre-determined small fraction of a track, it is considered 'off-track' and the hard drive is not allowed to write data. The control system must relocate the head to within the prescribed fraction of a track before the system is returned to the 'on-track' state and writing can resume. Therefore, it is important that the control system keeps the head on track once it has achieved the 'on-track' state.

To better regulate the position error of the system, the tracking controller is a series filter with $P_{err}$ as its input and a DAC command, u, as its output. Since the control system employs a fixed-point processor, a parallel cascade representation of the control system was chosen to minimize numerical issues. A block diagram of the tracking controller is shown in FIG. 7. This form permits a large portion of the controller to be pre-computed so that the computational delay is minimized. The $K_{ca}$, $K_{cb}$ and $K_{cc}$ variables are used to adjust the pole and zero locations of the filter. The $K_m$ variable allows the integrator to be turned on and off depending on the control system logic. Finally, the $K_{loop}$ variable is used to adjust the DC gain of the controller so that calibration routines can set an open-loop crossover frequency of 600 Hz for the open-loop system.

The over all transfer function for the control system shown in FIG. 4 can be written as $$\frac{u}{P_{err}} = K_{loop} \frac{z^3 + (K_{ni} - K_{ca} - 2)z^2 + (K_{ca} + K_{cb} + 1)z - K_{cb}}{z(z-1)(z-K_{cc})}. \tag{19}$$

Notice that the controller has an integrator to drive the position error to zero, a pole at the origin in the z-domain (at infinite it the s-domain) and a pole at z=$K_{cc}$. The zeros of the series filter are determined by the values of $K_{ca}$, $K_{cb}$ and $K_m$. The values for each gain are $K_{ca}$=0.2737, $K_{cb}$=0.3811, $K_{cc}$=0.2765, $K_{loop}$=0.1786 and $K_m$=0 or 0.0072.

Since the value of $K_m$ can either be 0 or 0.0072, the characteristics of the filter change when the integrator is turned on or off. Both conditions are checked to ensure that the system is stable for both modes of operation. When the integrator is off, $K_m$=0 and the series filter can be factored into $$\frac{u}{P_{err}} = K_{loop} \frac{(z-1)(z^2 - (K_{ca}+1)z + K_{cb})}{z(z-1)(z-K_{cc})} \tag{20}$$

to demonstrate how a zero is created to cancel the integrator pole.

The frequency response of the tracking controller for current mode shows that the primary effect of turning the integrator off is a gain shift to a constant value of −31.5 dB and a phase shift of 90° below 100 Hz. Near the open-loop crossover frequency of 600 Hz, the magnitude and phase of the two controllers are nearly identical so there are no critical stability issues related to the integrator.

The effect of the tracking controller on the plant frequency response can be summarized as follows. When the integrator is 'off', the gain margin is 7.4 dB, the phase margin is 40.6° and the open-loop crossover frequency is 563.1 Hz. After turning 'on' the integrator, the gain margin becomes 7.5 dB, the phase margin becomes 40.8° and the open-loop crossover frequency becomes 534.7 Hz. In either case, the phase margin for the tracking controller is nearly 10° larger than the phase margin for the seeking controller. This extra phase margin will reduce the amount of overshoot in the seek response as the head approaches the desired track.

SUMMARY OF THE INVENTION

This invention comprises a control system architecture for voltage mode control of the voice coil motor VCM in a hard disk drive. The design methods and philosophies employed for the voltage mode architecture of this invention, were adapted in part, from current mode control approaches when appropriate, and only algorithms relevant to both approaches were migrated to the voltage mode design. For example, the square root velocity profile method for current mode control can be used in voltage mode control. The only modification required is to appropriately scale the regulator gains.

The control system design was developed first, in the background section of this application, for current mode control of a hard disk drive. In the detailed description of the invention, the adaptation of the design to voltage mode control is presented. Experimental data validates the system models used.

BRIEF DESCRIPTION OF THE DRAWINGS

These and other aspects of the invention are illustrated in the drawings, in which.

DETAILED DESCRIPTION OF THE INVENTION

Figure 1:
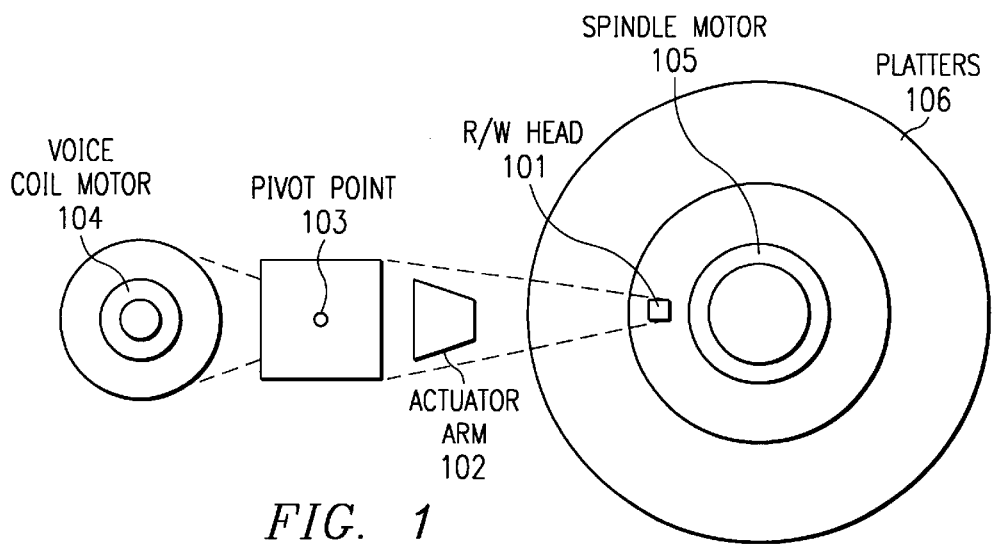
FIG. 1 illustrates a Hard Disk Drive assembly from top view and in simplified form.
Figure 2:
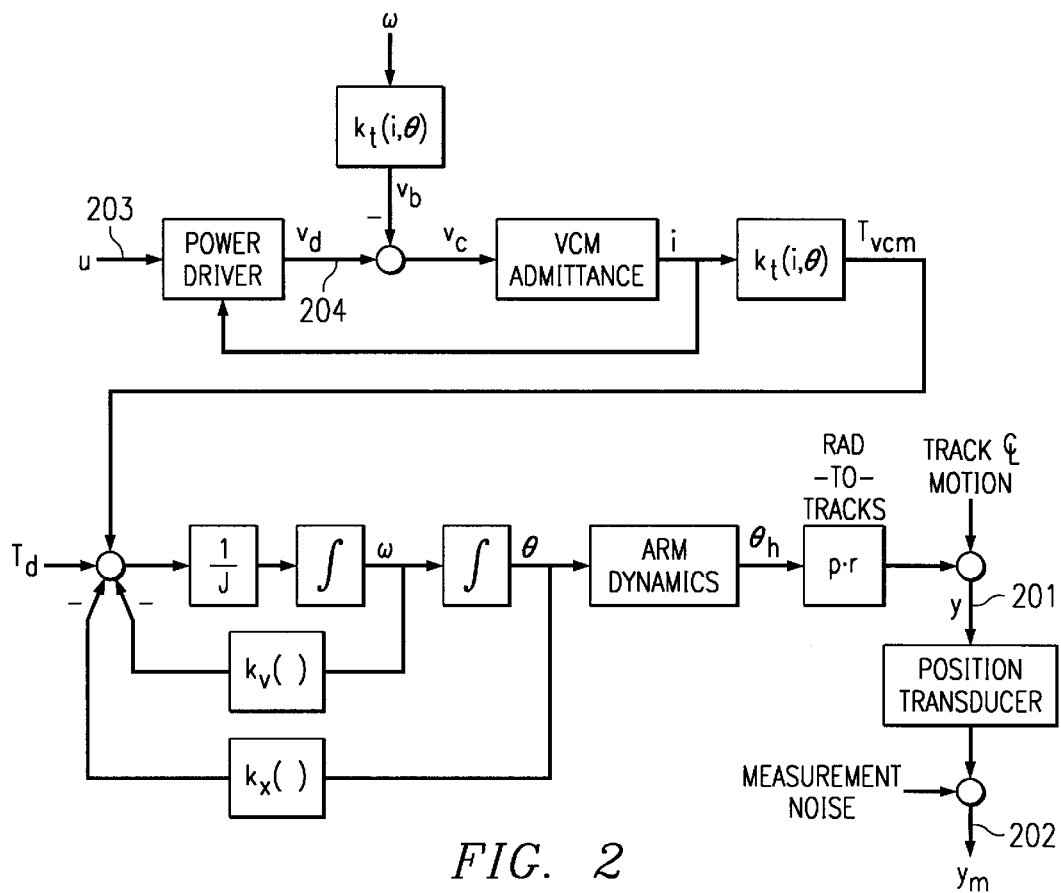
FIG. 2 illustrates the equivalent model of the plant corresponding to the simplified HDD assembly of FIG. 1.
Figure 3:
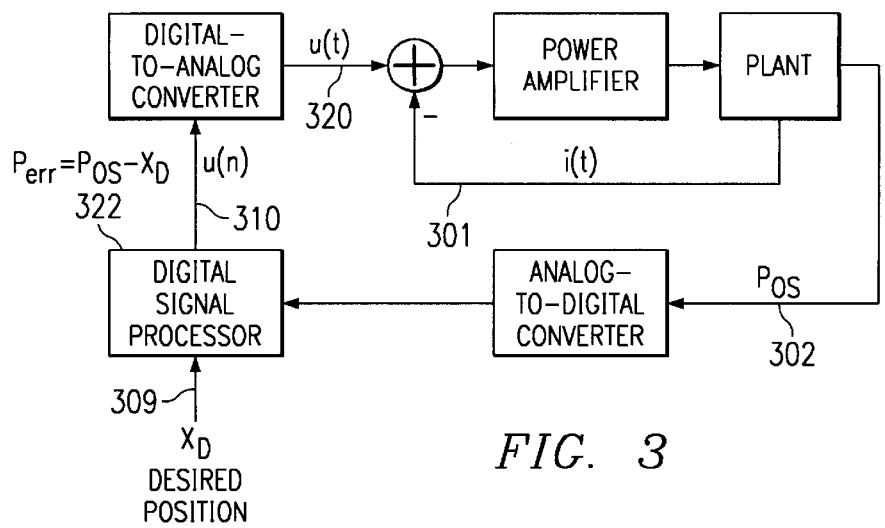
FIG. 3 illustrates a voice coil motor in a conventional hard disk drive controlled with a current command to a transconductance loop.
Figure 4:
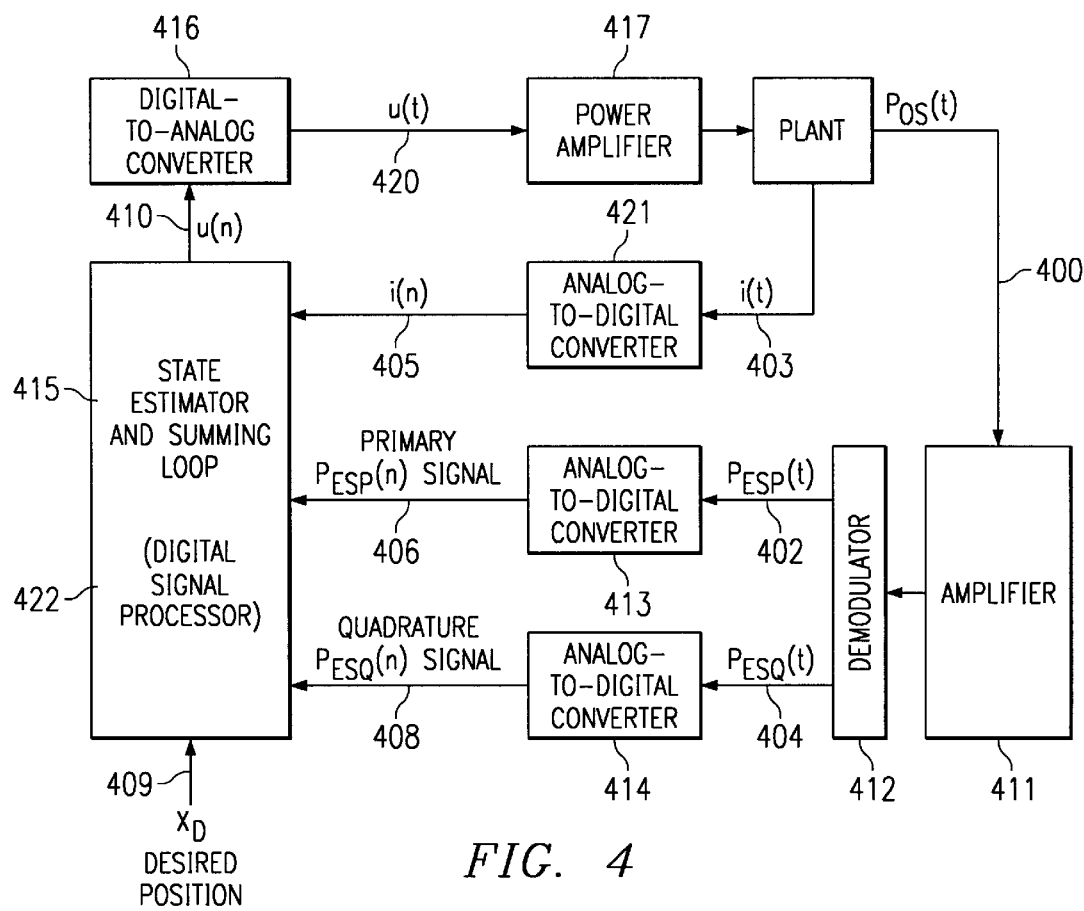
FIG. 4 illustrates the control system block diagram derived from U.S. Pat. No. 4,679,103 which is largely representative of presently used current mode control techniques.
Figure 5:
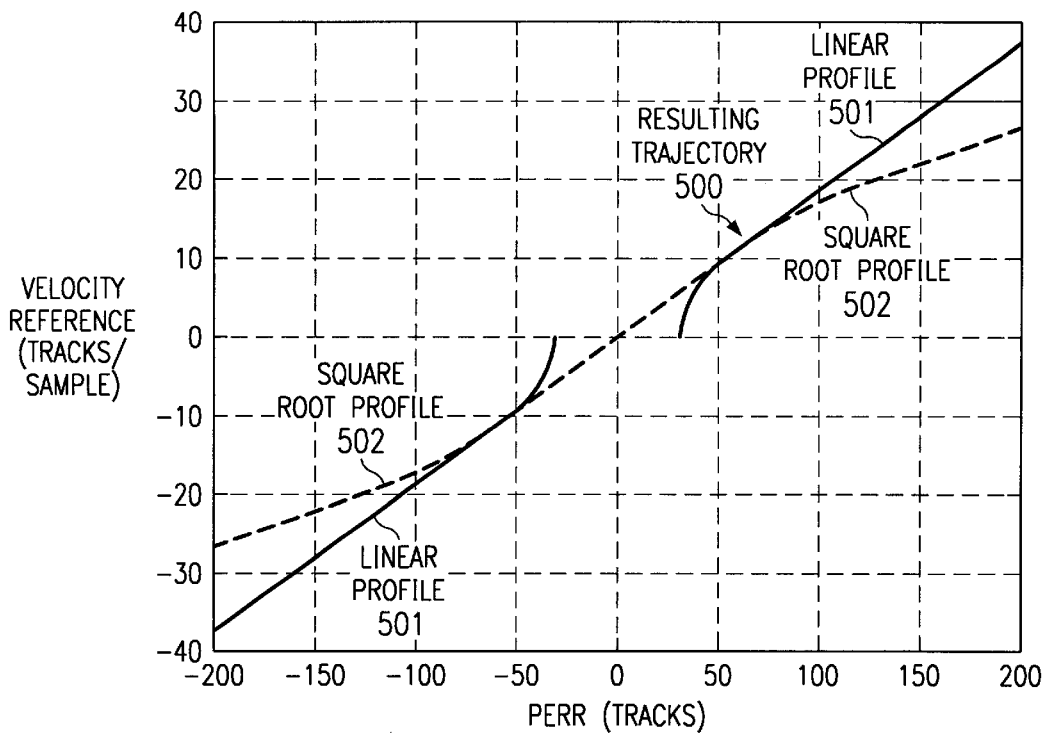
FIG. 5 illustrates a plot of the linear velocity profile command and the square root velocity profile command.
Figure 6:
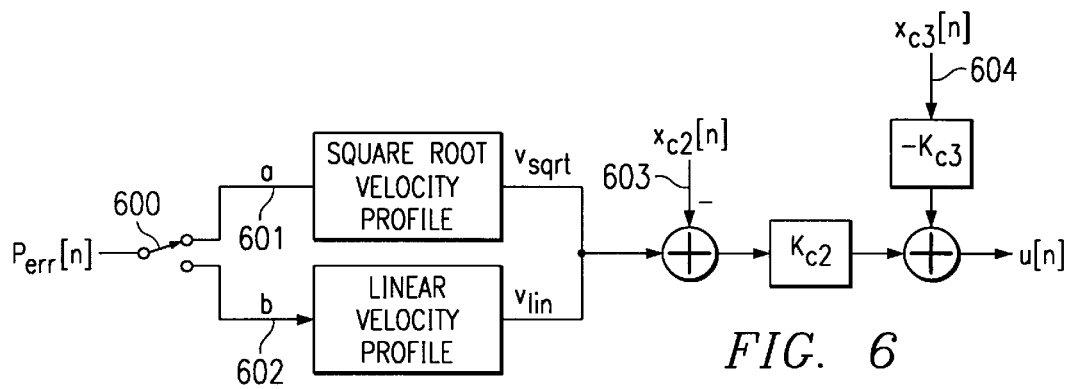
FIG. 6 illustrates the block diagram of the deceleration portion of the seeking current mode controller.
Figure 7:
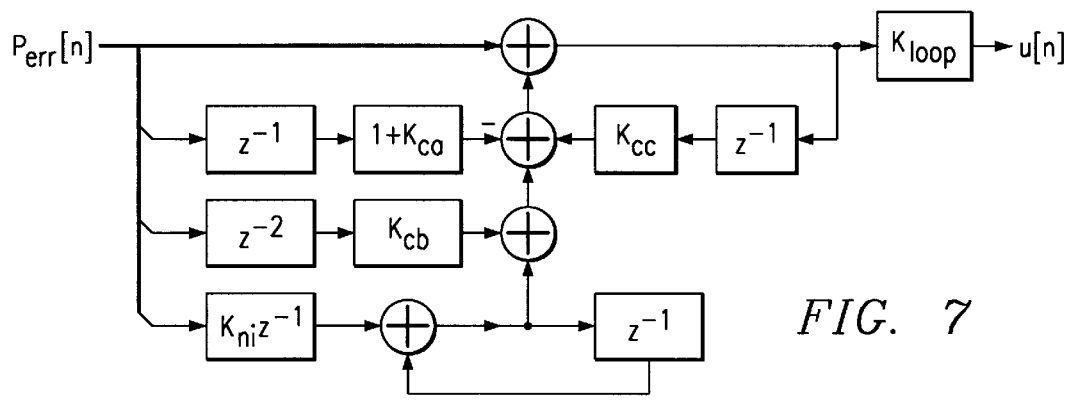
FIG. 7 illustrates a block diagram of a series filter for tracking mode which permits a large portion of the current mode controller to be pre-computed so that the computational delay is minimized.
Figure 8:
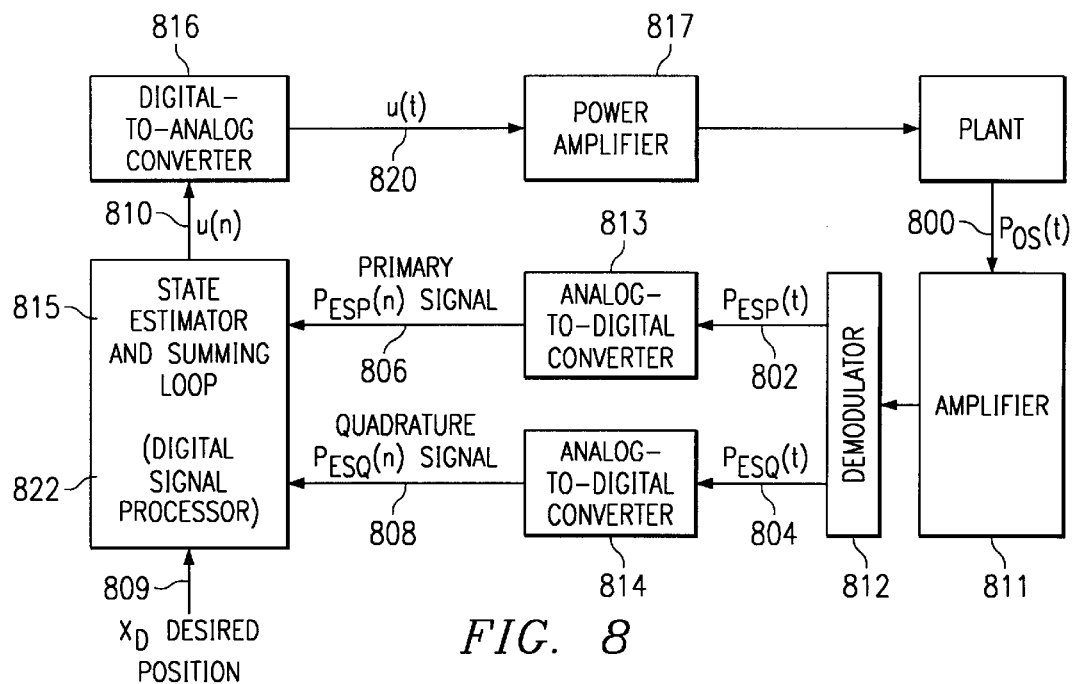
FIG. 8 illustrates the voltage mode control system architecture of this invention which uses voltage mode control techniques and does not require measurement of voice coil current or feedback relating to voice coil current.

The voltage mode control architecture is illustrated in simplified form in FIG. 8. The position signal Pos 800 is amplified in block 811 and then separated into primary 802 and quadrature 804 components in the demodulator 812. These signals are converted to digital samples $P_{ESP}(n)$ 806 and $P_{ESQ}(n)$ 808 by A/D converters 813 and 814 respectively. Desired position signal $x_D$ 809 is supplied as an input to the state estimator and summing loop function 815 which completes computation of the control input signal u(n) 810 from the two components $P_{ESP}(n)$ and $P_{ESQ}(n)$. The digital signal u(n) is then converted in D/A converter 816 to the analog control input signal u(t) 820 which drives the power amplifier 817.

The derivations below lead to expressions for the ratio $P_{err}/u(n)$ in terms of plant parameters. In these equations $P_{err}$ is the position error of the head, i.e. the difference between the desired track position $X_D$ of the head and the actual track position of the head $P_{OS}$.

Voltage Mode Control System

The following describes the reduced order model for voltage mode control of a hard disk drive actuator and the related control system design. The control system has two major functions, seeking mode and tracking mode, like the current mode architecture. The design of each controller is discussed and guidelines are provided where appropriate after the model of the actuator is discussed.

Voltage Mode Actuator Model

The model of a hard disk drive actuator under voltage mode control was shown to be of the form $$\dot{x}=Ax+Bu \quad y=Cx \tag{21}$$

where the state vector, x, was defined as $$x = \begin{bmatrix} \theta \\ \omega \\ i \\ b \end{bmatrix} \text{ and} \tag{22}$$

$$A = \begin{bmatrix} 0 & 1 & 0 & 0 \\ 0 & 0 & \frac{K_t}{J} & 0 \\ 0 & -\frac{K_b}{L} & -\frac{R+R_s}{L} & \frac{K_{drv}}{L} \\ 0 & 0 & 0 & 0 \end{bmatrix} \quad B = \begin{bmatrix} 0 \\ 0 \\ \frac{K_{drv}}{L} \\ 0 \end{bmatrix} \quad C^T = \begin{bmatrix} K_{pes} \\ 0 \\ 0 \\ 0 \end{bmatrix}. \tag{23}$$

Equations (22) and (23) represent collectively the information contained in the equation of FIG. 8 for voltage mode control. The states are θ, the angular position of the VCM shaft in units of radians, ω, the angular velocity of the VCM shaft in units of radians/sec, i, the VCM coil current in units of Amperes and b, a bias in units of D/A bits. The output is y, the position of the read/write head in units of track bits.

Although the plant is positioned by a discrete-time control system running in a DSP, the computational delay in the voltage mode plant model was thought to have a negligible effect on the design of the control system. Therefore, this delay was not included in the voltage mode plant model.

For convenience in the firmware, the units of the state variables were also changed for voltage mode. The transformation $$T = \begin{bmatrix} K_{pes} & 0 & 0 & 0 \\ 0 & K_{pes} \cdot T_s & 0 & 0 \\ 0 & 0 & 20000 & 0 \\ 0 & 0 & 0 & 1 \end{bmatrix} \quad (24)$$

was applied to give the angular position state units of bits, the angular velocity state units of track bits/sample and the coil current state units of 20000*A. The units of the bias state were unchanged by this transformation.

After changing the units of the state variables, the numerical model of the voltage mode plant can be written in the form $$x[n+1]=Fx[n]+Gu[n]\ y[n]=Hx[n] \quad (25)$$

where $$F = \begin{bmatrix} 1 & 0.99803 & 0.11659 & 0.40638 \\ 0 & 0.99448 & 0.20297 & 1.1389 \\ 0 & -0.031199 & 0.40407 & 6.4365 \\ 0 & 0 & 0 & 1 \end{bmatrix} \quad (26)$$

$$G = \begin{bmatrix} 0.40638 \\ 1.1389 \\ 6.4365 \\ 0 \end{bmatrix} \quad H^T = \begin{bmatrix} 1 \\ 0 \\ 0 \\ 0 \end{bmatrix}$$

This simplified model of the voltage mode plant has an integrator, a pole at 18 Hz representing the mechanical time constant of the VCM and a pole at 980 Hz representing the electrical time constant of the VCM.

Given the model and frequency response of the voltage mode plant, the control system can now be designed to make the hard disk drive seek and track. Since these two modes of operation are distinctly different, there is actually a separate controller for each one.

Voltage Mode Seeking Controller

The purpose of the seeking controller is to move the actuator arm from the current track location to within a few tracks of a desired track location in the shortest amount of time possible. This objective is accomplished for voltage mode control in the same manner as it was in current mode control, by controlling the acceleration and deceleration portions of the seek trajectory. Once the head position error is within a prescribed number of tracks, the control system transitions from the seeking controller to the tracking controller.

The acceleration portion of the seek trajectory is basically open loop from a control systems perspective. The control system determines the sign and magnitude of the maximum command it can apply based on the direction and length of the seek. Using an estimator, the velocity is predicted for the next control cycle to determine when the deceleration portion of the seek trajectory should be used. Once the predicted velocity exceeds the velocity necessary for decelerating to the desired track, the deceleration portion of the seek trajectory is activated.

The deceleration portion of the seek trajectory is separated into two parts depending on the number of tracks that the head is from the desired track. If the head is more than 60 tracks from the desired track, then a square root velocity profile command is used to control the head position. For example, if the head is within 60 tracks, then a linear velocity profile command is used to control the head position.

To compute the appropriate control commands, predicted head velocity is once again needed during the acceleration portion of the seek trajectory and current head velocity is needed during the deceleration portion of the seek trajectory. As with current mode control of a hard disk drive, the position of the head is determined by comparing the relative amplitudes of servo bursts and a state estimator is used to provide the velocity estimates. The same current estimator/regulator form $$x_c[n]=x_p[n]+L_c(y[n]-Hx_p[n])\ x_p[n+1]=Fx_c[n]+Gu[n]u[n]=-K_cx_c[n] \quad (27)$$

is used in the voltage mode control system design.

Figure 9:
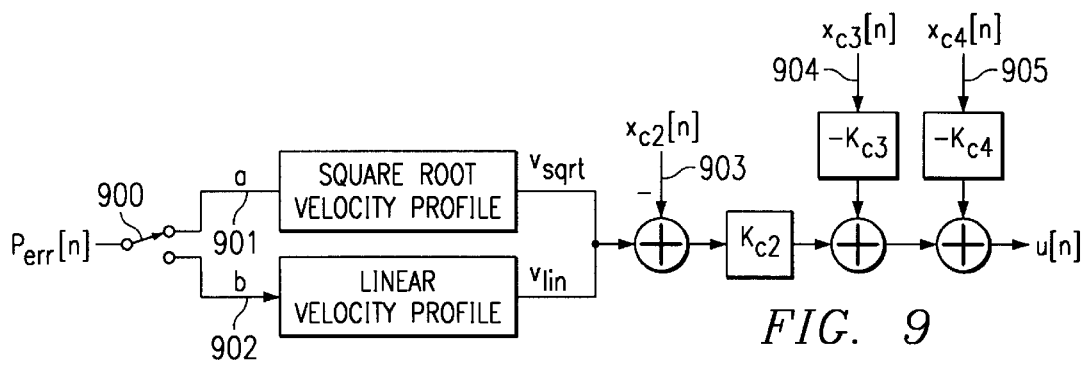
FIG. 9 illustrates the block diagram of the deceleration portion of the voltage mode seeking controller.

From this one form, the predicted head velocity can be determined for the acceleration portion of the seek trajectory and the current head velocity can be determined for the deceleration portion of the seek trajectory. A block diagram showing the seeking deceleration controller is shown in FIG. 9. This form of the regulator allows the square root velocity profile and the linear velocity profile to coexist in the same control architecture. The current velocity estimate is subtracted from the desired velocity to form a velocity error which drives the rest of the control system.

To control and stabilize the voltage mode plant, the controller will need an integrator to minimize the position error and two lead terms to add phase margin near the crossover frequency. Since the electrical pole is within one decade of the desired crossover frequency, an additional zero will be required to compensate for the phase loss from this term. Pairing a pole with each zero, the controller will contain a third order polynomial in its numerator and denominator. The location of each pole and zero is orchestrated so that the low frequency gain is maximized while achieving roughly the same gain and phase margin as the current mode seeking controller.

The series filter developed for the voltage mode architecture can be written as $$C(z) = \frac{0.2785z(z-0.4260)(z^2 - 1.7812z + 0.7957)}{(z - 0.0009)(z-1)(z^2 - 0.0517z + 0.1184)}. \quad (28)$$

The controller frequency response can be combined with the plant frequency response to produce the open loop frequency response. For this seeking controller, the gain margin is 6.6 dB, the phase margin is 30.7° and the open-loop crossover frequency is 543.0 Hz.

Voltage Mode Tracking Controller

The purpose of the tracking controller is to assume control of the VCM from the seeking controller when the head is a few tracks away for the desired track and move it to the desired location with less than one track of overshoot. This objective is accomplished for voltage mode control in the same manner as it was in current mode control. Once the head is within a pre-determined fraction of a track for several consecutive control cycles, the system is considered to be 'on-track' and reading and writing data can occur. If the head position ever exceeds a small fraction of a track, it is considered 'off-track' and the hard drive is not allowed to write data. Therefore, it is important that the control system keeps the head 'on-track' once it has achieved the on track state.

To better regulate the position error of the system, the tracking controller is a series filter with $P_{err}$ as its input and a DAC command, u, as its output. The rationale for designing this controller is very similar to the rationale for designing the seeking controller. The controller will need an integrator to minimize the position error and two lead terms to add phase margin near the crossover frequency. Since the electrical pole is within one decade of the desired crossover frequency, an additional zero will be required to compensate for the phase loss from this pole. Pairing a pole with each zero, the controller will contain a third order polynomial in its numerator and denominator. However, since the integrator can turn on and off, stability considerations force an additional pole and zero to be added to the transfer function of the controller. The resulting form of the tracking controller for voltage mode can be written as $$\frac{u}{P_{err}} = K_{loop} \frac{b_0 z^4 + b_1 z^3 + b_2 z^2 + b_3 z + b_4}{z^4 + a_1 z^3 + a_2 z^2 + a_3 z + a_4} \quad (29)$$

Each pole and zero is located so that the low frequency gain is maximized while achieving roughly the same gain and phase margin as the current mode open loop system.

Figure 10:
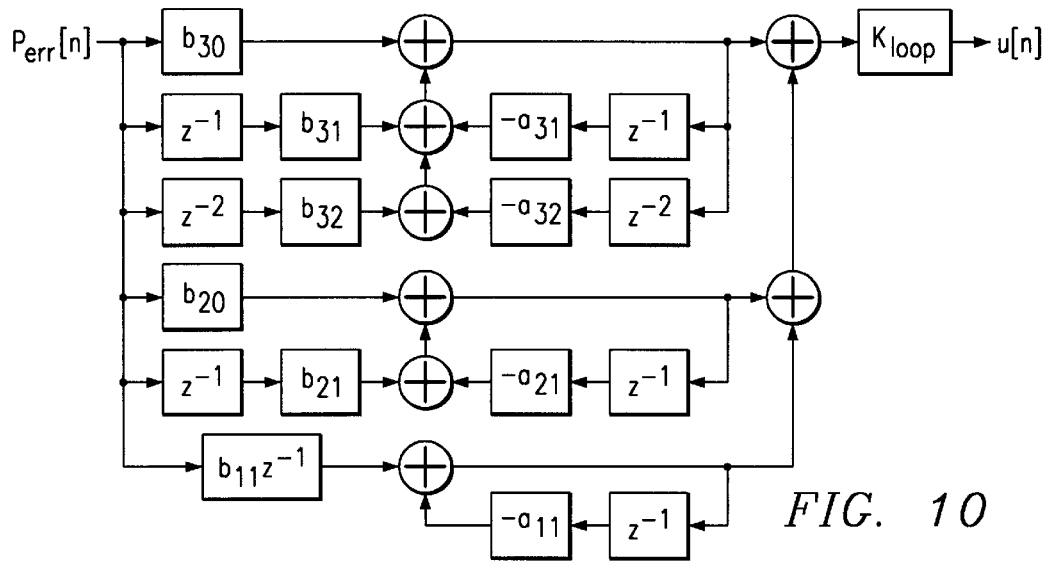
FIG. 10 illustrates a block diagram of the series filter representation for tracking mode which permits a large portion of the voltage mode controller to be pre-computed so that the computational delay is minimized.

Since the control system is running on a fixed-point processor, a parallel representation of the control system was chosen to minimize numerical issues. FIG. 10 shows an equivalent block diagram of the series filter in equation (29). This form permits a large portion of the controller to be pre-computed so that the computational delay is minimized. The $\alpha_{11}$, $\alpha_{21}$, $\alpha_{31}$ and $\alpha_{32}$ variables configure the pole locations of the filter. Since the controller has one integrator, $\alpha_{11}=-1$. The remaining terms, $\alpha_{21}$, $\alpha 31$ and $\alpha_{32}$, can be found from the pole locations of the desired filter. The $b_{11}$, $b_{20}$, $b_{21}$, $b_{30}$, $b_{31}$ and $b_{32}$ variables control the zero locations of the filter. The $b_{11}$ variable also allows the integrator to be turned on and off depending on the control system logic. Finally, the $K_{loop}$ variable is used to adjust the DC gain of the controller so that calibration routines can set an open-loop crossover at some nominal low frequency (as an example, 600 Hz) for the open-loop system. This variable has been nominally set to 0.25 in the model.

Since there are five numerator coefficients ($b_0$, $b_1$, $b_2$, $b_3$ and $b_4$) in the series filter and six unknown numerator coefficients ($b_{11}$, $b_{20}$, $b_{21}$, $b_{30}$, $b_{31}$, and $b_{32}$) in the parallel representation, an additional constraint equation must be established for a unique solution. The constraint chosen for this design is the DC gain of the second-order filter term in FIG. 10. By specifying this gain, the coefficients in this term can be balanced for more accurate fixed-point arithmetic. The matrix equation to solve for the unknown coefficients becomes $$\begin{bmatrix} 0 & 1 & 0 & 1 & 0 & 0 \\ 1 & a_{31}-1 & 1 & a_{21}-1 & 1 & 0 \\ a_{21}+a_{31} & a_{32}-a_{31} & a_{31}-1 & -a_{21} & a_{21}-1 & 1 \\ a_{32}+a_{21}a_{31} & -a_{32} & a_{32}-a_{31} & 0 & -a_{21} & a_{21}-1 \\ a_{21}a_{32} & 0 & -a_{32} & 0 & 0 & -a_{21} \\ 0 & 0 & 0 & 1 & 1 & 1 \end{bmatrix} \begin{bmatrix} b_{11} \\ b_{20} \\ b_{21} \\ b_{30} \\ b_{31} \\ b_{32} \end{bmatrix} = \begin{bmatrix} b_0 \\ b_1 \\ b_2 \\ b_3 \\ b_4 \\ 10^{dBGain/20}(1+a_{31}+a_{32}) \end{bmatrix} \quad (30)$$

where dBGain is the DC gain of the second-order filter term in decibels (dB). The values for each coefficient are $\alpha_{21}=-0.991$, $\alpha_{31}=0.2687$, $\alpha_{32}=0.0976$, $b_{11}=0.0091$ or 0, $b_{20}=-0.0062$, $b_{21}=0.0061$, $b_{30}=1.6648$, $b_{31}=-2.1231$ and $b_{32}=0.6414$. These gains make the DC gain of the second-order term −29.5 dB.

The frequency response of the tracking controller for voltage mode shows that the primary effect of turning the integrator off is a gain shift to a constant value of −30 dB and a phase shift of 90° below 100 Hz. Near the open-loop crossover frequency of 600 Hz, the magnitude and phase of the two controllers are nearly identical so there are not any stability issues related to the integrator.

Simulation results show that the effect of the tracking controller on the plant frequency response may be summarized as follows. When the integrator is off, the gain margin is 6.5 dB, the phase margin is 39.5° and the open-loop crossover frequency is 624.5 Hz. After turning on the integrator, the gain margin becomes 6.6 dB, the phase margin becomes 40.5° and the open-loop crossover frequency becomes 600 Hz. In either case, the phase margin for the tracking controller is nearly 10° larger than the phase margin for the seeking controller. This extra phase margin will reduce the amount overshoot in the seek response as the head approaches the desired track.

Experimental Validation

Figure 11A:
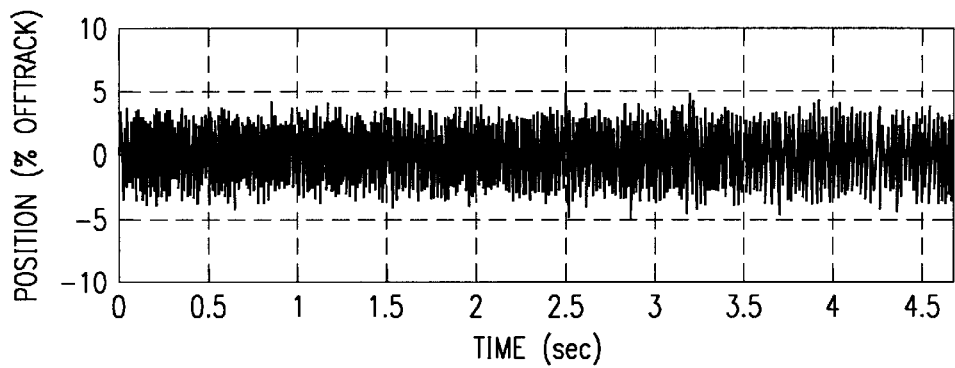
FIG. 11 illustrates the behavior of the composite PES signal during track follow for both current mode and voltage mode control architectures.
Figure 11B:
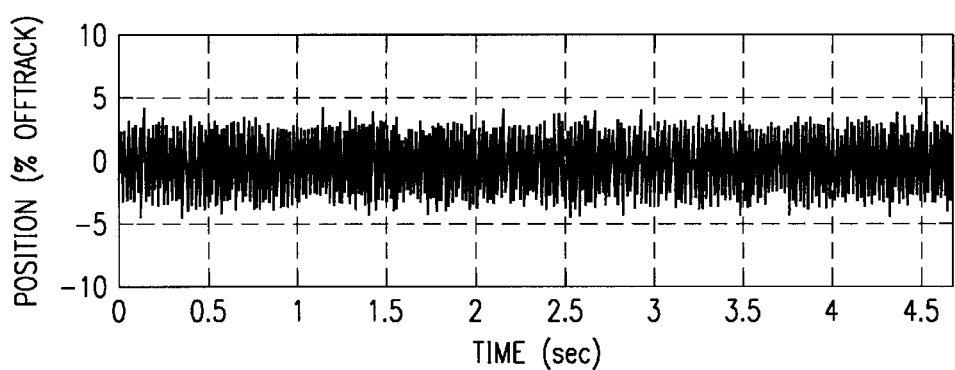
Figure 12:
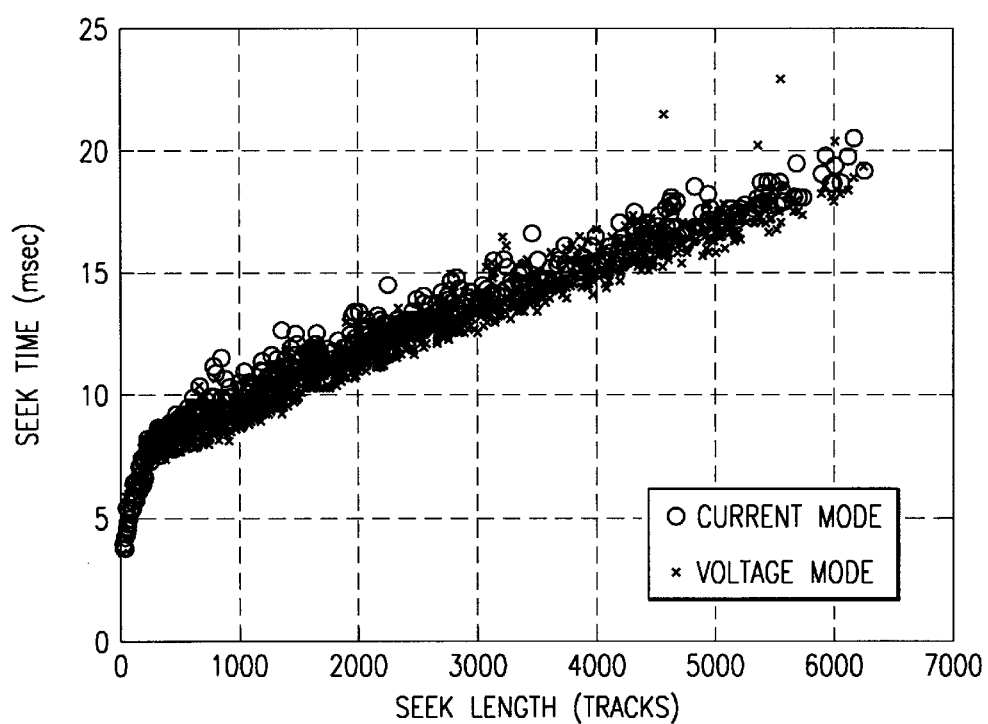
FIG. 12 illustrates a scatter plot of seek time versus seek length for 1000 random seeks for both the current mode and the voltage mode architectures.

FIG. 11 illustrates the behavior of the composite PES signal for both current mode 1101 and voltage mode 1102 at track number 2600, a representative central track. The statistical parameters such as mean, $\mu$, standard deviation, $\sigma$, and maximum value, max, are essentially the same for the current mode and the voltage mode control architectures. FIG. 12 illustrates the results from a random seek test by plotting seek time in milliseconds versus seek length in tracks for current mode and voltage mode. For a given seek length, the seek times are essentially equivalent for the current mode and voltage mode control architectures. Both FIG. 11 and FIG. 12 illustrate that there is virtually no difference in performance between the two architectures. The voltage mode architecture of this invention provides a simpler solution requiring less hardware, which lowers the overall cost.

What is claimed is:

1. A method for controlling the data track seeking and following of a head in a data recording disk file of the type having a disk with servo information thereon defining data track centerlines, a head for reading samples of the servo information during rotation of the disk, an actuator connected to the head and responsive to an input signal for positioning the head to the centerline of a target track during track seeking and maintaining the head over the centerline of the target track during following, the method comprising the steps of:

sensing from the servo information a sampled head position error signal (PES) representative of the position of the head relative to the centerline of the nearest track;

estimating for each PES sample an absolute head position relative to a fixed reference;

estimating for each PES sample a head velocity;

estimating for each PES sample an actuator current;

estimating for each PES sample a bias force indicative of the equivalent actuator input signal required to compensate bias forces acting on the actuator; and calculating for at least each PES sample an actuator voltage control signal as a function of said PES signal, said estimated absolute head position, said estimated head velocity, said estimated actuator current and said estimated bias force.

2. The method according to claim 1, wherein:

said step of calculating an actuator voltage control signal includes calculation of a difference between said estimated absolute head position and a desired head position.

3. The method according to claim 2, wherein:

said step of calculating an actuator voltage control signal includes calculating an open loop acceleration portion until said estimated head velocity exceeds a velocity necessary for decelerating to said desired head position and the calculating a deceleration portion until said estimated absolute head position equals said desired head position.

4. The method according to claim 3, wherein:

said step of calculating an actuator voltage control signal includes calculating a first deceleration portion having a square root velocity profile if said estimated absolute head position differs from said desired head position by more than a predetermined amount and having a linear velocity profile if said estimated absolute head position differs from said desired head position by less than said predetermined amount.

5. An apparatus for controlling the data track seeking and following of a head in a data recording disk file of the type having a disk with servo information thereon defining data track centerlines, a head for reading samples of the servo information during rotation of the disk, an actuator connected to the head and responsive to an input signal for positioning the head to the centerline of a target track during track seeking and maintaining the head over the centerline of the target track during following, the apparatus comprising:

detecting the servo information;

demodulating said servo information into an in-phase position signal and a quadrature position signal;

a first analog-to-digital converter converting receiving said in-phase position signal and converting said in-phase position signal into a digital in-phase position signal;

a second analog-to-digital converter converting receiving said quadrature position signal and converting said quadrature position signal into a digital quadrature position signal;

a digital signal processor connected to said first analog-to-digital converter for receiving said digital in-phase position signal, said second analog-to-digital converting receiving said digital quadrature position signal, receiving a desired position signal, said digital signal processor programmed to calculate from said digital in-phase position signal and said digital quadrature position signal a sampled head position error signal (PES) representative of the position of the head relative to the centerline of the nearest track;

estimate for each PES sample an absolute head position relative to a fixed reference; and calculate for at least each PES sample a digital actuator voltage control signal as a function of said PES signal and the desired position signal; and a digital-to-analog converter connected to said digital signal processor receiving said digital actuator signal and generating an analog actuator signal for supply to the actuator.

6. The apparatus of claim 5, wherein:

said digital signal processor is further programmed to calculate said actuator voltage control signal by calculating an open loop acceleration portion until said estimated head velocity exceeds a velocity necessary for decelerating to said desired head position and the calculating a deceleration portion until said estimated absolute head position equals said desired head position.

7. The apparatus of claim 6, wherein:

said digital signal processor is further programmed to calculate said actuator voltage control signal by calculating a first deceleration portion having a square root velocity profile if said estimated absolute head position differs from said desired head position by more than a predetermined amount and having a linear velocity profile if said estimated absolute head position differs from said desired head position by less than said predetermined amount.

8. An apparatus for controlling the data track seeking and following of a head in a data recording disk file of the type having a disk with servo information thereon defining data track centerlines, a head for reading samples of the servo information during rotation of the disk, an actuator connected to the head and responsive to an input signal for positioning the head to the centerline of a target track during track seeking and maintaining the head over the centerline of the target track during following, the apparatus comprising:

detecting the servo information;

demodulating said servo information into an in-phase position signal and a quadrature position signal;.

a first sample-and-hold circuit receiving and holding said in-phase position signal;

a second sample-and-hold circuit receiving and holding said quadrature position signal;

an analog-to-digital converter receiving said in-phase position signal and said quadrature position signal, said analog-to-digital converter multiplexed between said in-phase position signal and said quadrature position signal said for alternately converting said held in-phase position signal into a digital in-phase position signal and said held quadrature position signal into a digital quadrature position signal;

a digital signal processor connected to said first analog-to-digital converter for receiving said digital in-phase position signal, said second analog-to-digital converting receiving said digital quadrature position signal, receiving a desired position signal, said digital signal processor programmed to calculate from said digital in-phase position signal and said digital quadrature position signal a sampled head position error signal (PES) representative of the position of the head relative to the centerline of the nearest track;

estimate for each PES sample an absolute head position relative to a fixed reference; and calculate for at least each PES sample a digital actuator voltage control signal as a function of said PES signal and the desired position signal; and a digital-to-analog converter connected to said digital signal processor receiving said digital actuator signal and generating an analog actuator signal for supply to the actuator.

9. The apparatus of claim 8, wherein:

said digital signal processor is further programmed to calculate said actuator voltage control signal by calculating an open loop acceleration portion until said estimated head velocity exceeds a velocity necessary for decelerating to said desired head position and the calculating a deceleration portion until said estimated absolute head position equals said desired head position.

10. The apparatus of claim 9, wherein:

said digital signal processor is further programmed to calculate said actuator voltage control signal by calculating a first deceleration portion having a square root velocity profile if said estimated absolute head position differs from said desired head position by more than a predetermined amount and having a linear velocity profile if said estimated absolute head position differs from said desired head position by less than said predetermined amount.

11. A method for controlling the data track seeking and following of a head in a data recording disk file of the type having a disk with servo information thereon defining data track centerlines, a head for reading samples of the servo information during rotation of the disk, an actuator connected to the head and responsive to an input signal for positioning the head to the centerline of a target track during track seeking and maintaining the head over the centerline of the target track during following, the method comprising the steps of:

sensing from the servo information a sampled head position error signal (PES) representative of the position of the head relative to the centerline of the nearest track;

estimating for each PES sample an absolute head position relative to a fixed reference; and calculating for at least each PES sample an actuator voltage control signal as a function of said PES signal at a frequency other than a PES sample frequency.

* * * * *